April 18, 1933. L. B. CHAPMAN 1,904,122
DETACHABLE SNAP FASTENER FOR ARTICLES TO BE LAUNDERED
Filed Aug. 20, 1932
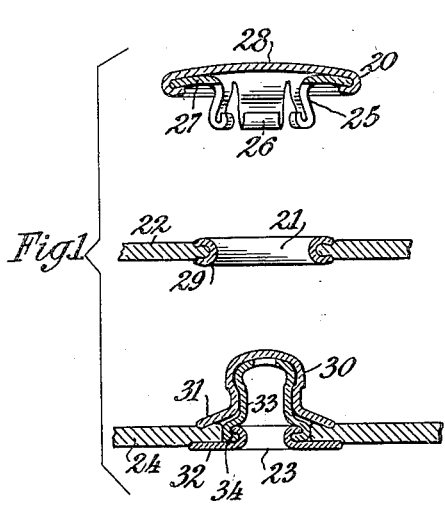
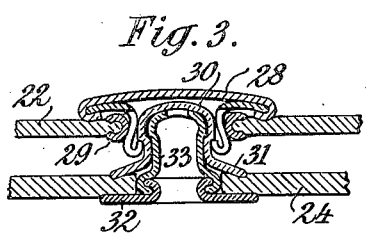
Fig. 3.
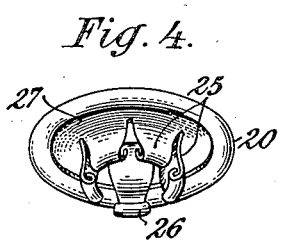
Fig. 4.
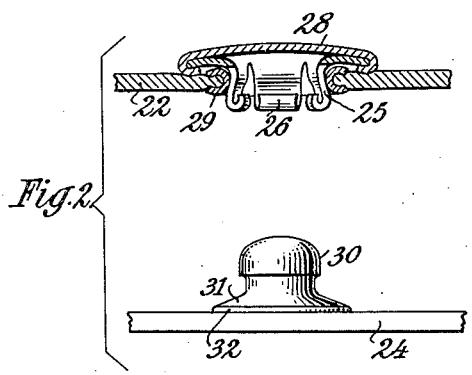
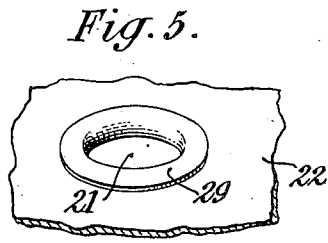
Fig. 5.
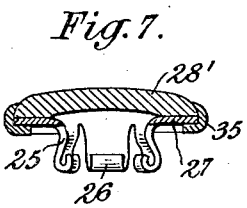
Fig. 7.
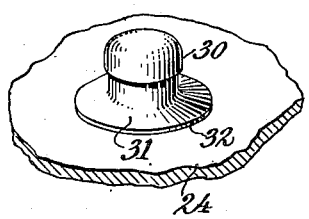
Fig. 6.
INVENTOR
Lyman B. Chapman,
BY Fraser, Myers
& Manley,
ATTORNEYS.

Patented Apr. 18, 1933

1,904,122

UNITED STATES PATENT OFFICE

LYMAN B. CHAPMAN, OF WATERBURY, CONNECTICUT, ASSIGNOR TO SCOVILL MANUFACTURING COMPANY, OF WATERBURY, CONNECTICUT, A CORPORATION OF CONNECTICUT

DETACHABLE SNAP FASTENER FOR ARTICLES TO BE LAUNDERED

Application filed August 20, 1932. Serial No. 629,576.

This invention relates to improvements in detachable snap fasteners of the stud and socket type to be used on garments or other articles intended to be laundered.

It is the object of the invention to provide a fastener, the headed element of which may be readily detached from the material of the garment or similar article on which it is used to facilitate laundering.

In the drawing, illustrating preferred forms of the invention,—

Figure 1 is a sectional view of the three component parts of the fastener represented in a disassembled relation;

Fig. 2 is a view of the same three parts, two of the parts being represented in assembled relation and the third part detached;

Fig. 3 is a sectional view of the three parts of the fastener assembled;

Figs. 4, 5 and 6 are perspective views, respectively, of the three parts of the fastener represented in disassembled relation; and Fig. 7 is a sectional view of the socket element of the fastener embodying the invention in modified form.

The invention, as represented in Fig. 1, comprises in general a socket element 20, an eyelet or ring-like element 21 which may be secured to one of two pieces of material 22 to be connected, and a stud element 23 to be connected to another piece 24 of two pieces to be connected.

The socket element 20 is provided with an extension 25, preferably of circular form and constructed in such manner that it may be contractible and also expansible. In the form herein disclosed, the extension 25 comprises a circular series of resilient fingers 26.

The socket element as a whole may be constructed in any appropriate manner, and may comprise a back element 27 and a cap 28 which may have its marginal portion turned over the margin of the back element so as to securely fasten the two parts together.

The eyelet 21 should be of a size and form such as to co-operate with the extension 25 of the stud element, and its inner diameter should be of a dimension such that the spring fingers 26 may be snapped through the eyelet into a detachable engaging relation therewith, with the opening in the socket exposed so as to be adapted to receive the stud element.

The ring, as indicated in Fig. 1, may comprise a cylindrical element having oppositely-disposed, outwardly-turned flanges 29 which may be pressed together and clamp the surrounding portion of the material of the article to which the eyelet is secured.

The stud element may be of any suitable construction and, as indicated in Fig. 1, comprises a head 30 having a flange 31 and a perforated disk-like element 32, which may be connected with each other by means of a connecting element 33 having one end expanded into the head 30 and the other end connected with the element 32 by means of a pair of interlocking flanges 34. The material 24 may be clamped between the marginal portions 31, 32.

The specific manner in which the parts of each of the elements of the fastener are constructed and secured together is intended to be conventional and constitutes no part of the invention herein to be claimed.

The dimensions of the head 30 of the stud element should be so proportioned with respect to the dimensions of the eyelet 21 and the resilient extension of the socket 28 as to permit the head to be snapped into engagement with the extension of the socket after it has been inserted in the eyelet, as indicated in Fig. 2, so that all three parts may be detachably attached in the manner clearly indicated in Fig. 3.

In use a number of eyelets 21 will be secured in one part of the article to be fastened in positions in which the sockets are intended to be located, and a number of stud elements 23 will be correspondingly secured to the other part of the article to be connected by the fastener. The socket elements 28 may then be snapped into their engaging relations with the eyelets, after which the parts of the article may be detachably connected and disconnected, by merely snapping the stud elements into their engaging relations with the socket elements and detaching them as desired.

The socket heads 28 may be in the form of buttons of some considerable size which would afford an obstruction to the laundering of the article on which they are used. The detachable connection between the socket elements 20 and the eyelet 21 makes it possible to very readily detach the socket elements whenever the article is to be laundered. After the completion of the laundering they may be again easily returned to their assembled relation with the garment.

It is not essential that the extension on the socket element, the opening in the eyelet, and the head of the stud element be of circular form. All that is of importance is that they be of corresponding form such that the extension of the socket element may conform with the opening in the ring and properly receive the head of the stud element. Nor is it essential that the extension on the socket element be the resilient part of the fastener. What is required is that one or more of the three parts shall be resilient in order that they may be assembled with the eyelet positioned between the stud element and the socket element. The form illustrated in the accompanying drawing, comprising a circular opening in the eyelet and a circular series of expansible and contractible spring fingers on the socket element forming a neck or extension of sufficient length to pass through the eyelet and receiving the circular head 30 of the stud element, is disclosed as one satisfactory form of the invention.

It will be obvious that the construction of the socket element may be modified to provide for the manufacture of fasteners having heads of any desired type or character. For example, in Fig. 7 is illustrated a form of socket element having in place of the cap 28 of Fig. 1 a top 28′, which might be of pearl, glass, or other suitable ornamental material, secured to the back element 27 by means of a flanged clamping ring 35.

The invention is not intended to be limited to either of the specific forms herein selected for purposes of illustration, but should be regarded as including modifications and variations thereof within the scope of the appended claims.

What is claimed is:

1. In an article to be laundered, the combination with two parts to be detachably secured together, of a three-part separable snap fastener of the stud-and-socket type comprising a fastener element permanently secured to one part, a fastener element permanently secured to the other part, and a detachable fastener element comprising an ornamental head and an attaching stem, at least one of the three fastener elements having a resilient attaching means and the three elements being of such relative sizes and forms that the stem of the detachable element may be snapped into a detachable engagement with one of the permanently secured fastening elements and the two elements thus attached, one at least of which is resilient, then snapped into a detachable engagement with the other permanently attached fastener element, the detachable element having the ornamental head being readily removable from the elements secured to the article when the article is to be laundered and subsequently reattached.

2. The combination defined by claim 1, of which one of the permanently secured fastener elements is an eyelet, the other a stud, and the stem of the member having the ornamental head a socket to detachably engage the eyelet and detachably receive the stud.

3. The combination defined by claim 1, of which one of the permanently secured fastener elements is a substantially rigid eyelet, the other a substantially rigid stud, and the stem of the member having an ornamental head a resilient socket to detachably engage the eyelet and detachably receive the stud.

In witness whereof, I have hereunto signed my name.

LYMAN B. CHAPMAN.